United States Patent [19]

Raineri

[11] Patent Number: 4,484,587
[45] Date of Patent: Nov. 27, 1984

[54] AXIAL-FLOW THRESHER-SEPARATOR UNIT FOR COMBINE HARVESTERS

[75] Inventor: Giuseppe Raineri, Bassano del Grappa, Italy

[73] Assignee: Pietro Laverda S.p.A., Italy

[21] Appl. No.: 498,440

[22] Filed: May 26, 1983

[30] Foreign Application Priority Data

Jun. 9, 1982 [IT] Italy ............... 67737 A/82

[51] Int. Cl.³ .............. A01F 12/40; A01F 29/02
[52] U.S. Cl. ................ 130/27 T; 130/27 R; 56/14.6
[58] Field of Search .......... 56/14.6, 16.4, DIG. 5; 130/22 A, 27 R, 27 B, 27 M, 27 T, DIG. 2

[56] References Cited

U.S. PATENT DOCUMENTS

| 1,688,662 | 10/1928 | Schlayer | 130/27 T |
| 1,744,144 | 1/1970 | Schlayer | 130/27 T |
| 3,669,123 | 6/1972 | Gaeddert et al. | 130/27 R |
| 3,982,549 | 9/1976 | De Pauw et al. | 56/14.6 |
| 4,342,319 | 8/1982 | Willis et al. | 130/27 R |

Primary Examiner—Gene Mancene
Assistant Examiner—John G. Weiss
Attorney, Agent, or Firm—Sughrue, Mion, Zinn, Macpeak & Seas

[57] ABSTRACT

The thresher-separator unit has a cutter unit at its discharge end including a cutter member carried at the discharge end of the thresher-separator cylinder and provided with at least one radial bracket with a series of blade sections. The cutter unit further includes a casing which surrounds the upper part of the cutter member and is provided internally with at least one series of fixed blade sections located in alternating positions with respect to the blade sections of the cutter member and arranged to cooperate therewith to cut the straw leaving the thresher-separator unit. This unit further includes a spreading reel located below the cutter member and rotatable about a vertical axis to spread the cut straw uniformly on the ground. A bladed roller between the cutter member and the spreading reel is rotatable about an axis parallel to the axis of the thresher-separator cylinder and is arranged to prevent the stoppage of the flow of material and facilitate its discharge from the cutter unit. The cutter-spreader unit can easily be interchanged with a unit for discharging the straw in a window.

3 Claims, 5 Drawing Figures

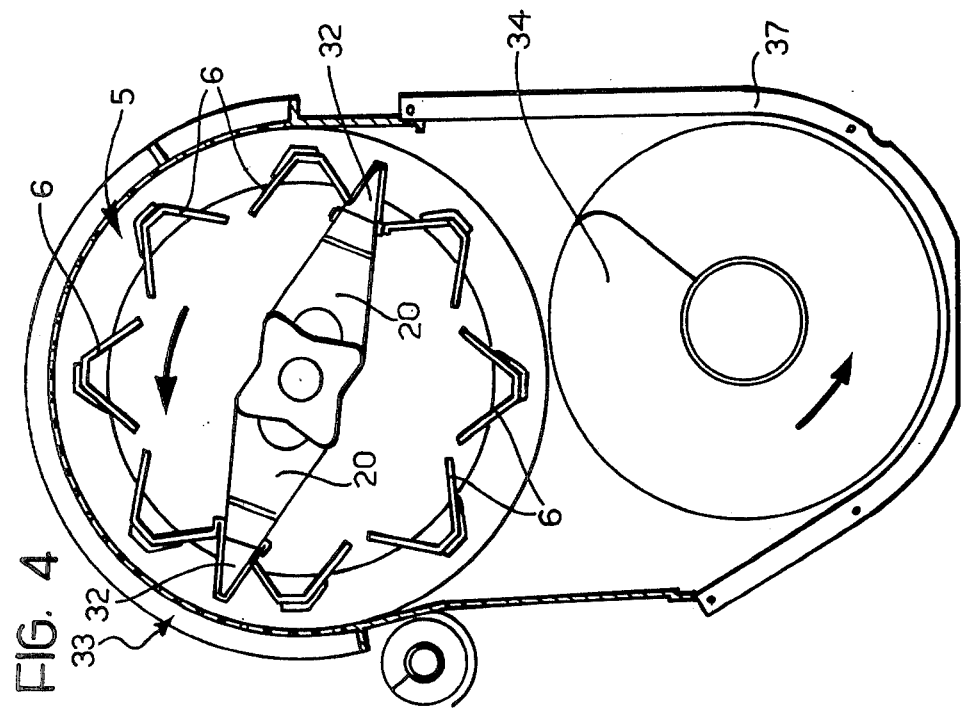
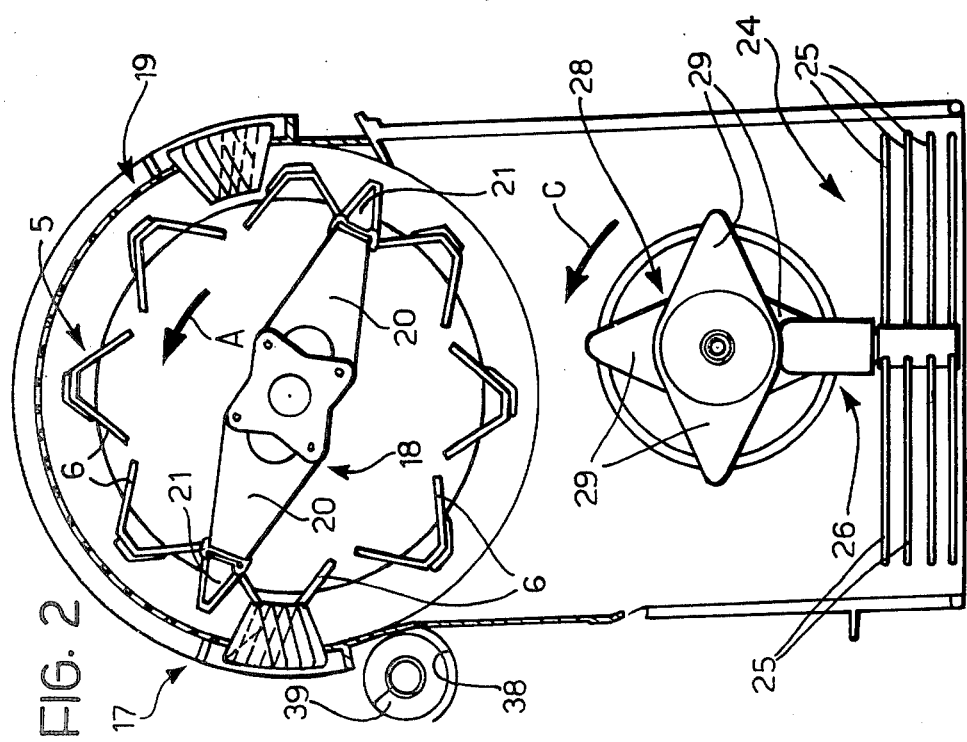

AXIAL-FLOW THRESHER-SEPARATOR UNIT FOR COMBINE HARVESTERS

The present invention relates to an axial-flow thresher-separator unit for combine harvesters, of the type comprising:

a thresher-separator cylinder;

a thresher concave in the form of a concave grille located below the thresher-separator cylinder and partially surrounding a part of the cylinder adjacent the loading end of the unit, and a separator casing constituted by a perforated tubular body which surrounds that part of the thresher-separator cylinder which is not covered by the thresher concave, and is provided internally with helical ribs adapted to cooperate with bars provided on the thresher-separator cylinder to cause the advance of the product along a helical path towards the discharge end of the unit in the space between the thresher-separator cylinder and the separator casing.

A thresher unit of the type specified above is the subject of an earlier patent application No. 67968-A/81 filed by the same applicants.

In the case of the thresher-separator unit proposed previously, the straw and other material which does not pass through the holes in the separator casing at the end of its helical path around the thresher cylinder reaches the discharge end of the unit and falls onto the ground forming a windrow laterally of the harvester while the latter continues its advance.

On the other hand, in the general field of combine harvesters, it is already known to provide the harvester with a cutter-spreader device for cutting the straw leaving the machine and spreading it evenly on the ground, in cases where the discharge of the straw in a windrow gives rise to problems regarding its destination. The cut straw spread on the ground is then mixed therewith and buried during ploughing.

The known types of cutting-spreading devices are rather bulky and expensive, however, and require long and complicated assembly operations.

The object of the present invention is to provide an axial-flow thresher-separator unit of the type specified above which is provided with a cutter-spreading device having a simple and economic structure which can easily be interchanged with a device for discharging the straw in a windrow.

The main characteristic of the thresher-separator unit according to the invention lies in the fact that it is provided at its discharge end with a cutter unit comprising a cutter member carried at the discharge end of the thresher-separator cylinder and provided with at least one radial bracket carrying a series of blade sections, and a casing surrounding the upper part of the cutter member and provided internally with at least one series of fixed blade sections located in alternating positions with respect to the blade sections of the cutter member and arranged to cooperate therewith to cut the straw leaving the thresher-separator unit, and in that the thresher-separator unit further includes a spreader reel located below the cutter member and rotatable about a vertical axis to spread the cut straw uniformly on the ground.

According to a further characteristic, a bladed roller is located between the cutter member and the spreader reel and is rotatable about an axis parallel to the axis of the thresher-separator cylinder to prevent stoppage of the flow of material and facilitate its discharge from the cutter unit.

Further characteristics and advantages of the present invention will emerge from the description which follows with reference to the appended drawings, provided purely by way of non-limiting example, in which:

FIG. 2 is a schematic side view of a cutter-spreader unit with which the thresher-separator unit of the invention is provided;

FIGS. 4 and 5 are a schematic side view and a perspective view illustrating a unit for the lateral discharge of straw in a windrow, which is interchangeable with the unit of FIGS. 2 and 3.

Figure 1:
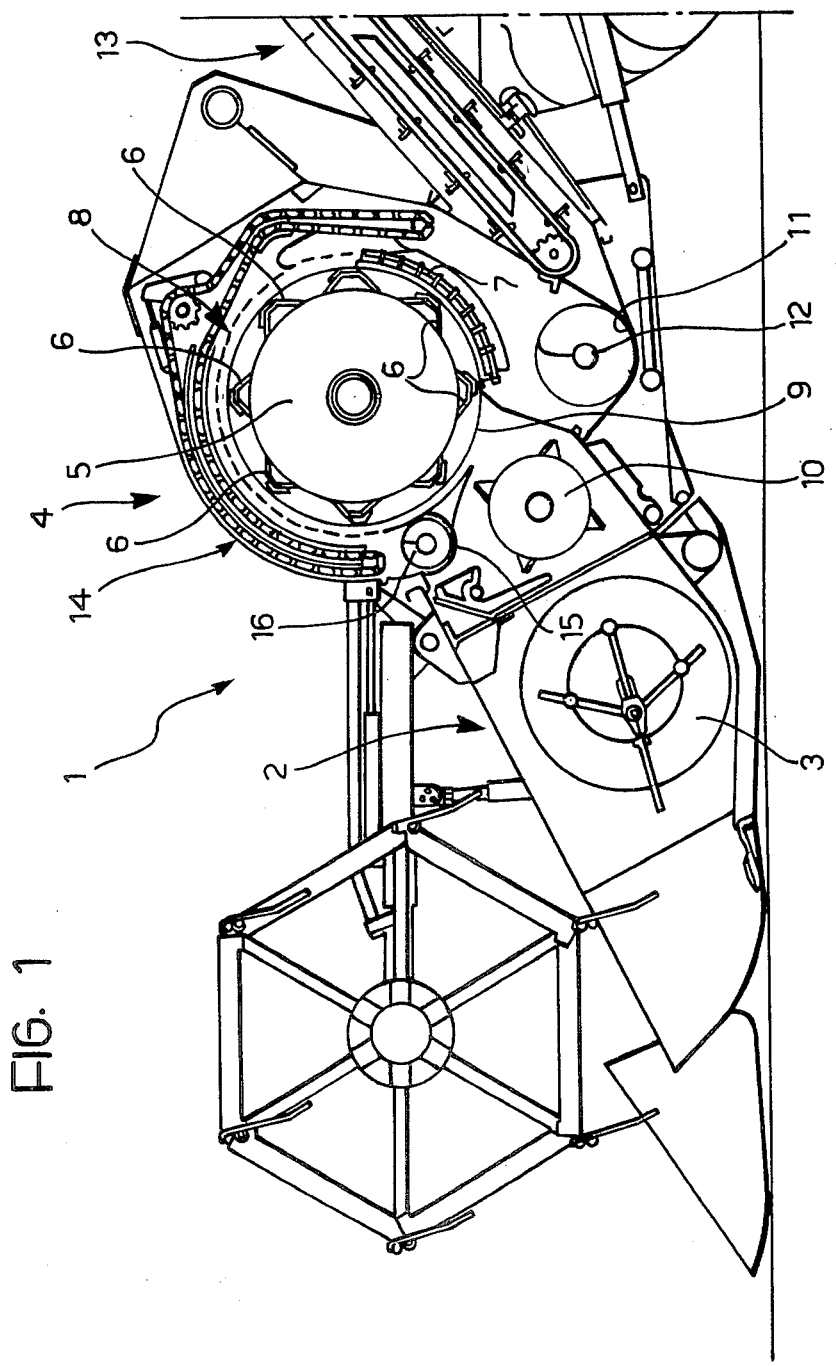
FIG. 1 is a schematic side view of the front part of a combine harvester provided with a thresher-separator unit according to the invention.

The combine harvester illustrated in FIG. 1, and generally indicated 1, is of the general type described and illustrated in the patent application Nos. 53321-B/80, 53561B/81 and 67968-A/81 filed by the same applicants.

The thresher-separator according to the present invention may also be attached, however, to combine harvesters of a different type from that described, by way of example, in the following description.

With reference to FIG. 1, the combine harvester includes a cutting table 2 including a feed auger 3 of a known type. Behind the feed auger 3 is a thresher-separator unit 4 of the axial-flow type, comprising a thresher-separator cylinder 5 with a series of longitudinal bars 6 around its periphery (partially illustrated in perspective in FIGS. 3 and 5). The bars 6 are constituted, in a known manner, by profiled elements having inclined transverse ribs.

The thresher-separator unit 4 further includes a thresher concave 7 in the form of a concave grille which is located below the thresher-separator cylinder 5 and partially surrounds a part of the cylinder 5 which is adjacent the loading end of the thresher-separator unit 4. In the example illustrated in the drawings, the loading end is located on the right-hand side of the combine harvester.

The thresher-separator unit finally includes a separating casing 8 constituted by a perforated tubular body which surrounds that part of the cylinder 5 not covered by the thresher concave 7. The casing 8 has internal helical ribs arranged to cooperate with the bars of the cylinder 5 to impart helical motion to the product, as described in more detail below.

At the loading end of the thresher-separator unit 4 (illustrated in section in FIG. 1), the separator casing 8 has an aperture 9 for feeding the harvested product through into the space between the cylinder 5 and the casing 8. Close to the aperture 9 is a transverse feed roller 10 for receiving the product from the cylinder 5 and conveying it to the thresher-separator unit 4.

As mentioned above, the product fed into the separator casing 8 follows a helical path around the thresher-separator cylinder 5, moving towards the discharge end of the thresher-separator unit. The grain and other materials separated during the movement of the product introduced into the thresher cylinder passes through the holes in the separator casing 8 and falls onto an underlying collecting floor 11, in correspondence with which is located a transverse auger 12. This auger conveys the grain and other separated material towards the loading end of a bladed elevator 13 for transporting the product to the cleaning members (not illustrated) which are located in the rear part of the harvester.

In the example illustrated in the drawings, the thresher-separator unit 4 is further provided with a cleaning device which is movable adjacent the upper part of the separator casing 8 to prevent any of the separated material from blocking the holes in the upper part of the separator casing. This cleaning member, which is driven by a chain 14 in FIG. 1, may, for example, be of the type described and illustrated in the aforesaid patent application No. 67968-A/81. As proposed in this patent application, the thresher-separator unit has a collecting floor 15 above the inlet zone of the unit (adjacent the right-hand side of the harvester) onto which the material transported by the cleaning device falls. In correspondence with this base is an auger 16 which moves the material towards the discharge end of the thresher-separator unit, causing it to fall onto the collecting floor 11 immediately the material has passed the inlet zone of the unit.

Figure 3:
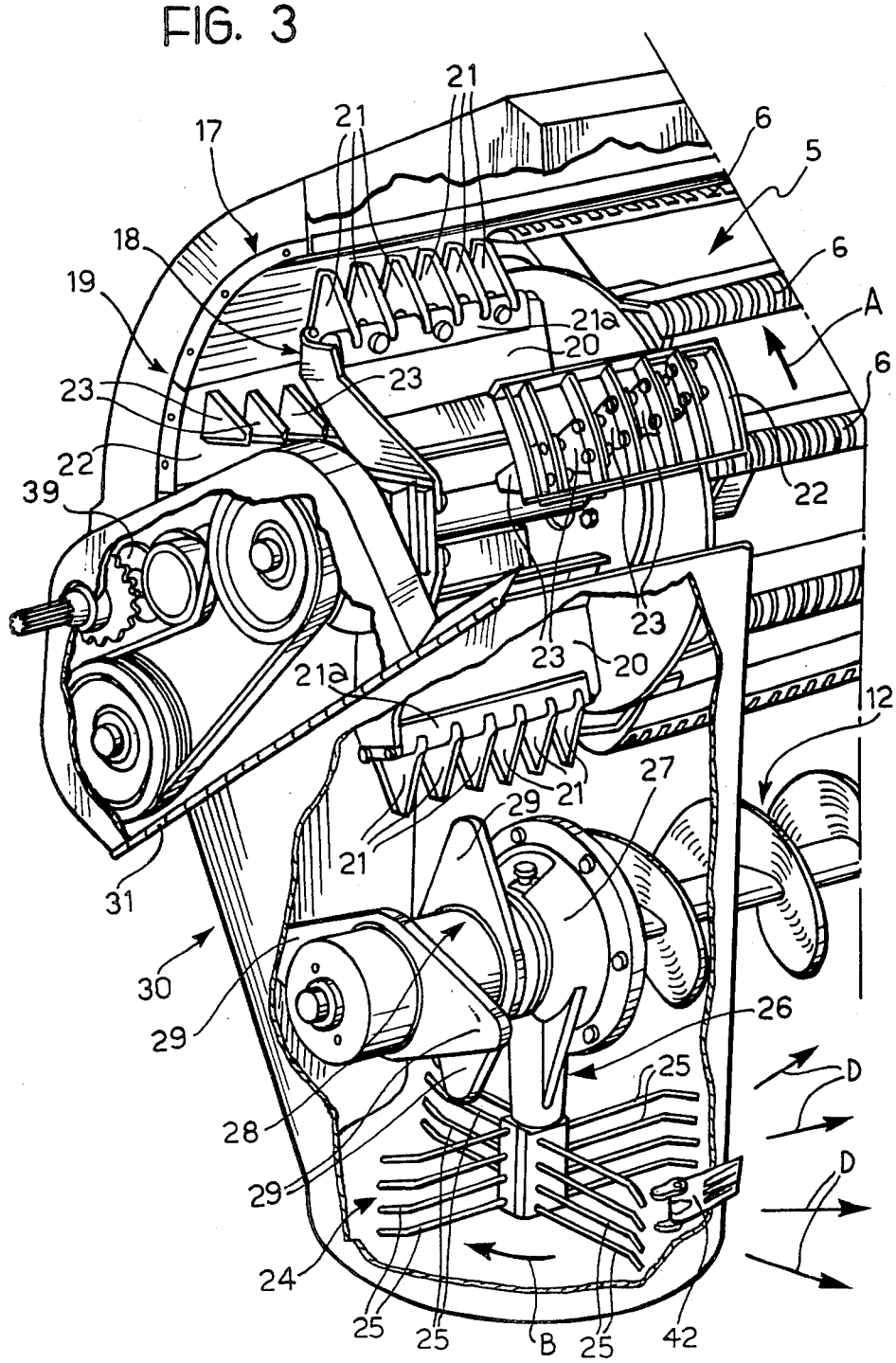
FIG. 3 is a perspective view of the unit of FIG. 2 on an enlarged scale.

The thresher-separator unit according to the present invention is further provided, at its discharge end, with a cutter-spreader device for cutting the straw which leaves the unit and spreading it uniformly on the ground. With reference to FIGS. 2 and 3 a cutter unit 17 includes a rotary cutter member 18 and a casing 19. The cutter member 18 includes two diametrally opposed radial brackets 20 carried by the discharge end of the thresher-separator cylinder 5. A blade 21a is fixed releasably to each bracket 20 and supports a series of parallel blade sections 21 which are spaced apart and lie in planes perpendicular to the axis of the thresher-separator cylinder 5. The casing 19 is provided internally, in diametrally opposite positions, with two fixed combs 22 each comprising a series of fixed blade sections 23 which are also parallel to each other and spaced apart. The blade sections 23 are offset in the axial direction of the thresher-separator cylinder relative to the blade sections 21 of the rotary cutter member 18, whereby each blade section 21 passes through the space between two blade sections 23 during the rotation of the thresher-separator cylinder 5. The direction of this rotation is indicated by arrow A in FIGS. 2 and 3.

Below the cutter unit 17 is a spreader reel 24 having combs 25. The spreader reel 24 is rotatable about a vertical axis on a support 26 fixed to the structure of the harvester. The spreader reel 24 is rotated in the direction indicated by the arrow B in FIG. 3 by a pair of bevel gears, housed in a casing 27, from the shaft of the auger 12.

A roller 28 is mounted on an outward prolongation of this shaft from the harvester so as to project from the latter, the roller having two pairs of radial blades 29 which are diametrally opposed to each other and disposed at right angles to each other. The lower part of the casing 19 of the cutter unit is open to allow the cut straw to fall onto the spreader reel 24 which spreads it uniformly on the ground. The bladed roller 28 has the function of preventing blockages of material and facilitating its discharge from the cutter unit (the direction of rotation of the roller 28 being indicated by the arrow C in FIG. 2).

Below the cutter unit, the unit constituted by the bladed roller 28 and the spreader reel 24 is protected by a casing 30 which is substantially semi-conical and is articulated to the casing 19 by a hinge 31 so as to facilitate access to the various members described above. In its closed condition, the casing 30 is locked to the structure of the machine by means of catch devices of the type indicated 42 in FIG. 3.

In operation, the straw and remaining material which does not pass through the holes in the separator casing 8 of the thresher-separator unit 4 reaches the end of the helical path in correspondence with the discharge end of the unit (located on the left-hand side of the harvester in the example described), where it is picked up and attacked by the blade sections 21 of the rotary cutter member 18, and is drawn by them against the fixed blade sections 23 which cut it up. The cut straw falls beneath the cutter unit and reaches the spreader reel 24 which spreads it in a horizontal plane in the directions indicated by the arrows D in FIG. 3. The bladed roller 28, as already described, prevents the blockage of material and facilitates its discharge from the cutter unit. The pivoted casing 30 covers about 180° of the spreader reel 24 so that it limits the field of spreading of the straw onto the ground which, in the case considered, occurs beneath the thresher-separator unit 4.

Figure 5:
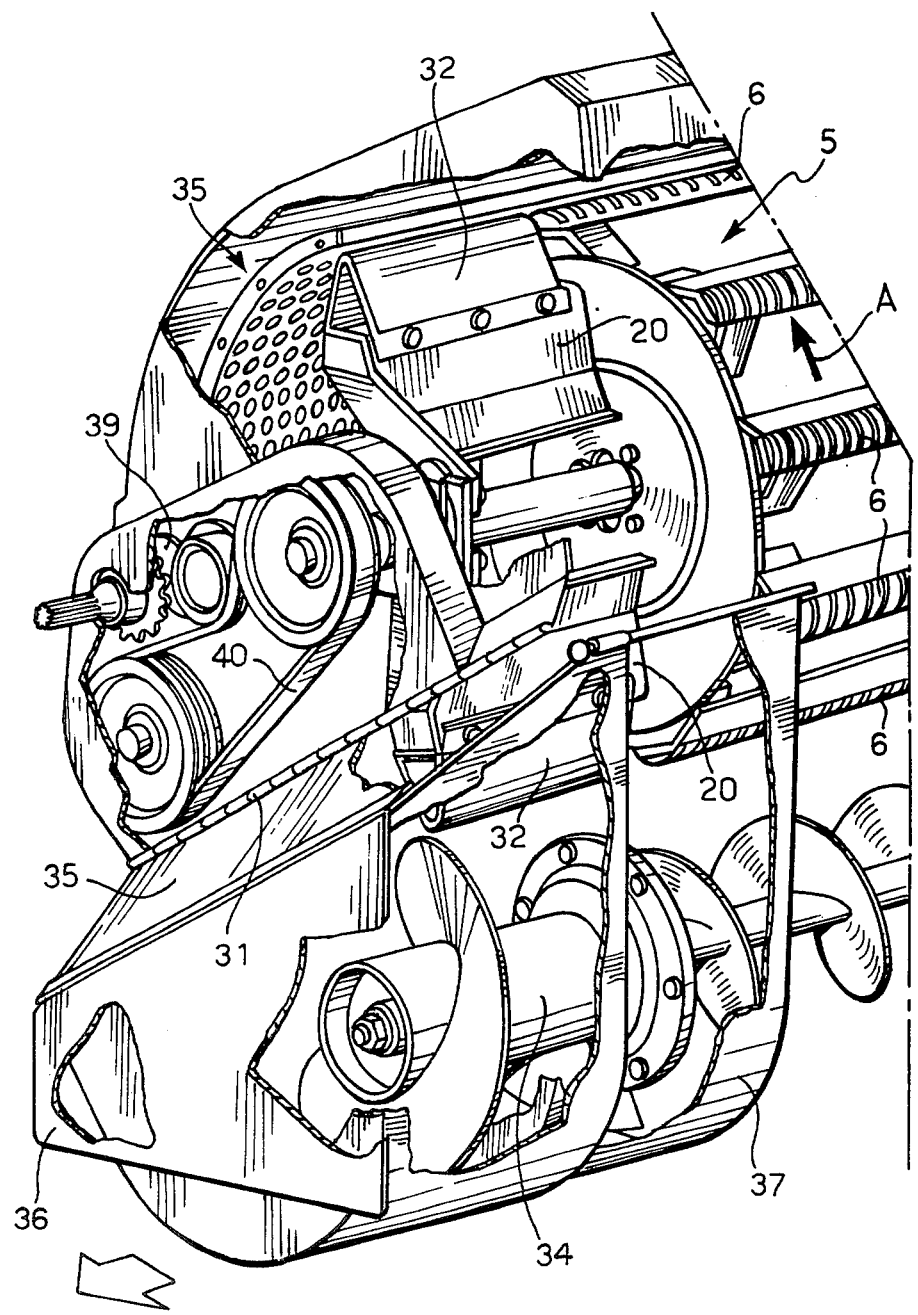

When it is not desired to cut the straw, the cutter-spreader unit described above is easily interchangeable with a device for discharging the straw laterally in a windrow, which is illustrated in FIGS. 4 and 5 of the appended drawings.

This change is effected by means of the following simple operations: the blades 21a fixed to the two brackets 20 and carrying the blade sections 21 are replaced by two rubber blades 32; the two fixed combs 22 are dismantled and the blind casing 19 is replaced by a perforated casing 33; the bladed roller 28 and the support 27 containing the pair of bevel gears are removed from the shaft of the auger 12, and an auger portion 34 is attached; the casing 30 is replaced by a cover 35 which is also articulated to the upper casing of the unit by means of a hinge 31 and is provided with rubberized canvas 36 connected along its upper edge to the cover 35, and finally a channel-shaped casing 37 is attached to surround the lower part of the auger portion 34.

In operation, the straw which reaches the discharge end of the thresher-separator unit is conveyed by the rubber blades 32 into the channel-shaped casing 34 and, from there, is discharged onto the ground by means of the auger portion 34, producing a windrow along the left-hand side of the harvester during its advance. The rubberized canvas 36 of the cover 35 slows the flow of the straw, regularizing the windrow on the ground.

Any material which passes through the holes in the casing 33 falls onto the collecting floor 38 in correspondence with which is located an auger 39. The auger 39 is rotated, through a belt transmission 40, by the shaft of the thresher cylinder 5. The material which falls onto the collecting floor 38 is transported by the auger 39 towards the left-hand side of the harvester until it reaches a zone where it falls onto the collecting floor 11.

Naturally, the principle of the invention remaining the same, the details of construction and forms of embodiment may be varied widely with respect to that described and illustrated purely by way of example, without thereby departing from the scope of the present invention.

I Claim:

1. An axial-flow thresher-separator unit for combine harvesters, including:
   a thresher-separator cylinder having external longitudinal bars;

a thresher concave constituted by a concave grille located below the thresher-separator cylinder and partially surrounding a part of said cylinder adjacent the loading end of the unit, and a separator casing constituted by a perforated tubular body which surrounds that part of the thresher-separator cylinder not covered by the thresher concave to define a space, and is provided with internal helical ribs adapted to cooperate with the bars of the thresher-separator cylinder to cause the advance of a harvested product along a helical path towards the discharge end of the unit in the space between the thresher-separator cylinder and the separator casing, wherein the improvements consist in the thresher-separator unit further including:

a cutter unit at its discharge end, comprising a cutter member fixed to the discharge end of the thresher-separator cylinder and provided with at least one radial bracket having a series of blade sections, and a casing surrounding the upper part of the cutter member and provided internally with at least one series of fixed blade sections located in alternating positions with respect to the blade sections of the cutter member for cooperation with the latter to cut the straw leaving the thresher-separator unit, and a spreading reel located below the cutter member and rotatable about a vertical axis to spread the cut straw uniformly on the ground.

2. An axial-flow thresher-separator unit as defined in claim 1, wherein a bladed roller is located between the cutter member and the spreader reel and is rotatable about an axis parallel to the axis of the thresher-separator cylinder.

3. An axial-flow thresher-separator unit as defined in claim 2, wherein an essentially semi-conical casing is provided to protect the bladed roller and the spreader reel, said semi-conical casing being open on its side facing inwardly of the combine harvester and being hinged to the casing of the cutter unit.

* * * * *